United States Patent
Gutscher et al.

(10) Patent No.: US 9,845,776 B2
(45) Date of Patent: *Dec. 19, 2017

(54) INJECTION DEVICE, AN INTERNAL COMBUSTION ENGINE, AND A METHOD FOR OPERATING AN INJECTION DEVICE FOR GASOLINE AND CNG

(75) Inventors: Andreas Gutscher, Markgroeningen (DE); Andreas Posselt, Muehlacker (DE); Marko Lorenz, Grossbottwar (DE)

(73) Assignee: ROBERT BOSCH GMBH, Stuttgart (DE)

(*) Notice: Subject to any disclaimer, the term of this patent is extended or adjusted under 35 U.S.C. 154(b) by 321 days.

This patent is subject to a terminal disclaimer.

(21) Appl. No.: 13/997,910

(22) PCT Filed: Nov. 7, 2011

(86) PCT No.: PCT/EP2011/069498
§ 371 (c)(1),
(2), (4) Date: Sep. 16, 2013

(87) PCT Pub. No.: WO2012/089382
PCT Pub. Date: Jul. 5, 2012

(65) Prior Publication Data
US 2014/0000559 A1  Jan. 2, 2014

(30) Foreign Application Priority Data
Dec. 27, 2010 (DE) .......... 10 2010 064 166

(51) Int. Cl.
*F02M 43/00* (2006.01)
*F02M 39/00* (2006.01)
(Continued)

(52) U.S. Cl.
CPC ......... *F02M 43/00* (2013.01); *F02D 19/0647* (2013.01); *F02D 19/0692* (2013.01);
(Continued)

(58) Field of Classification Search
CPC ......... F02D 19/08; F02D 41/04; F02M 35/10; F02M 35/108; F02M 43/00
(Continued)

(56) References Cited

U.S. PATENT DOCUMENTS 5,228,423 A    7/1993  Oikawa et al.
7,195,000 B2 *  3/2007  Kayama et al. ............ 123/432
(Continued)

FOREIGN PATENT DOCUMENTS

DE    10 2008 04393    6/2010
EP        2 000 663    12/2008
(Continued)

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

An injection device for an internal combustion engine having a first injection system for injecting fuel having a first fuel composition, and a second injection system for the injection of fuel having a second fuel composition that has a lower ethanol component than the first fuel composition, the first injection system having at least one first fuel injector for injecting fuel having the first fuel composition both in the direction of a first intake orifice of a combustion chamber of the internal combustion engine, and in the direction of a second intake orifice of the combustion chamber, in which the second injection system has a second fuel injector for injecting fuel having the second fuel composition essentially only in the direction of the first intake orifice, and a separate (Continued)

US 9,845,776 B2

Page 2 third fuel injector for injecting fuel having the second fuel composition essentially only in the direction of the second intake orifice.

13 Claims, 3 Drawing Sheets

(51) Int. Cl.
*F02M 21/02* (2006.01)
*F02M 35/10* (2006.01)
*F02M 35/108* (2006.01)
*F02M 69/04* (2006.01)
*F02M 69/52* (2006.01)
*F02D 19/06* (2006.01)
*F02D 19/08* (2006.01)
*F02D 41/00* (2006.01)
*F02D 41/06* (2006.01)

(52) U.S. Cl.
CPC ....... *F02D 19/081* (2013.01); *F02M 21/0278* (2013.01); *F02M 35/1085* (2013.01); *F02M 35/10177* (2013.01); *F02M 69/044* (2013.01); *F02M 69/52* (2013.01); *F02D 41/0025* (2013.01); *F02D 41/06* (2013.01); *Y02T 10/32* (2013.01); *Y02T 10/36* (2013.01)

(58) Field of Classification Search
USPC ... 123/1 A, 27 GE, 299, 300, 302, 304, 445, 123/525–527, 575
See application file for complete search history.

(56) References Cited

U.S. PATENT DOCUMENTS

| | | | |
|---|---|---|---|
| 8,027,777 B2* | 9/2011 | Ichihara et al. | 701/103 |
| 8,281,766 B2* | 10/2012 | Tomiita et al. | 123/432 |
| 8,689,768 B2* | 4/2014 | Saruwatari | 123/299 |
| 2004/0139944 A1 | 7/2004 | Nakano et al. | |
| 2004/0164187 A1* | 8/2004 | Kihara et al. | 239/552 |
| 2008/0271704 A1* | 11/2008 | Monnier | F02D 19/0631 |
| | | | 123/406.19 |
| 2009/0248275 A1 | 10/2009 | Ichihara et al. | |
| 2010/0050993 A1* | 3/2010 | Zhao | F02D 17/02 |
| | | | 123/481 |
| 2012/0240670 A1* | 9/2012 | Takashima | 73/114.49 |
| 2012/0279472 A1* | 11/2012 | Windbergs et al. | 123/445 |

FOREIGN PATENT DOCUMENTS

| | | |
|---|---|---|
| JP | 2006 342689 | 12/2006 |
| JP | 2007 262996 | 10/2007 |
| JP | 5098994 B2 | 7/2010 |
| RU | 2074974 C1 | 3/1997 |
| RU | 2330985 C2 | 8/2008 |

* cited by examiner

INJECTION DEVICE, AN INTERNAL COMBUSTION ENGINE, AND A METHOD FOR OPERATING AN INJECTION DEVICE FOR GASOLINE AND CNG

FIELD OF THE INVENTION

The present invention is based on an injection device.

BACKGROUND INFORMATION

Injection devices for internal combustion engines are believed to be generally understood. From the printed publication DE 10 2008 043 930 A1, for example, a fuel-injection system for an internal combustion is discussed, which is developed for the use of two or more different fuels, the injection system having fuel injectors which optionally are connectable to different fuel reservoirs. It is provided, in particular, that the same fuel injectors are used both for the injection of gasoline and for the infeed of gas such as compressed natural gas (CNG=Compressed Natural Gas) and liquid gas (LNG=Liquefied Natural Gas). Disadvantageous in this injection device is that different flow rates are required in the injection of gasoline-based fuels than in the supply of gas-based fuels. The fuel-metering range of a fuel injector, i.e., the particular range in which fuel is able to be injected at a particular accuracy, is limited, however.

SUMMARY OF THE INVENTION

The injection device according to the present invention, the internal combustion engine according to the present invention, and the method according to the present invention for operating an injection device according to the other independent claim have the advantage that, for one, the exhaust-gas emissions are reduced and, for another, the output of the internal combustion engine is able to be increased.

This may be achieved by injecting the fuel having the first fuel composition, whose main component may be natural gas, with the aid of the first injection system exclusively, whereas the fuel having the second fuel compositions, whose main component may be gasoline, is injected with the aid of the second injection system, which has two separate injection valves, exclusively. It has been shown that an operation of the internal combustion engine which realizes especially low exhaust emissions is achieved if an operation using fuel of the second fuel composition takes place during the start and in the low-load range of the combustion system, and an operation using fuel having the first fuel composition takes place in the presence of an increased or full load. When the internal combustion engine is operated using a fuel based on natural gas, much more fuel must be supplied through the individual fuel injector in comparison with an operation that uses a gasoline-based fuel, so that the demands with regard to the available flow rate range of the injection device are relatively high.

By separating the fuel injectors into those that inject fuel based on natural gas exclusively, and those that inject the gasoline-based fuel exclusively, the high demands on the available flow rate range of the particular fuel injector are met in a simple manner. The injection of gasoline-based fuel is required especially during the startup and warm-up phase, since an injection of fuel based on natural gas for starting the engine is relatively inefficient. Therefore, the second injection device is operated in particular in the start-up and warm-up phase, and may be throttled or completely switched off if a full load is at hand. The use of two separate fuel injectors, i.e., the second and third fuel injector, facilitates a homogeneous and stable burn-through of the injected fuel in the start-up and warm-up phase, in particular, because each fuel injector has to inject only a reduced through-flow quantity of fuel of the second fuel composition, so that lower spray density is achieved, i.e., the characteristic droplet size, especially the Sauter diameter, of the atomized fuel is reduced in advantageous manner, which results in a more rapid and stable burn-through of the fuel mixture in the combustion chamber.

An additional advantage are the two separate spray-discharge points of the second injection system; this degree of freedom allows an optimal injection of fuel with minimized wall wetting. This avoids deficits in the combustion process, ignition faults or incomplete combustion of the fuel mixture, and it reduces the raw exhaust gases. Especially in the start-up and warm-up phase, i.e., with a cold, as yet not (fully) converting catalyst, this leads to reduced exhaust emissions at the output of the catalytic converter. The better burn-through of the fuel mixture in the combustion chamber furthermore leads to a delayed ignition angle at the same irregular running, which moreover leads to an increased temperature in the combustion chamber and thus also to hotter raw exhaust gases.

This heats up the catalytic converter more rapidly in the start-up and warm-up phase, and it reaches the start-up temperature at which the catalytic converter begins to operate efficiently in a faster manner. The use of the two separate fuel injectors thus produces considerably fewer raw exhaust gases overall in the start-up and warm-up phase. Because of the reduced raw exhaust gases, the catalytic converter may advantageously have smaller dimensions, and a portion of the noble metals required for the catalytic converter is able to be saved. The improved burn-through and the resulting greater running smoothness furthermore allow a lower idling speed, which in turn reduces the exhaust emissions when operating with fuel of the second fuel composition. At high loads, the second injection system is throttled and/or switched off and the internal combustion is supplied with the fuel based on natural gas, which results in a relatively high output at low exhaust emissions and low fuel consumption. Because of fewer impurities, natural gas generally combusts in cleaner manner in comparison with gasoline and thus produces fewer exhaust gases. This achieves a considerable exhaust-gas reduction during load and full-load operation. The internal combustion engine according to the present invention may include an Otto engine having manifold injection for a motor vehicle, which may be an automobile. In addition, the internal combustion engine may have more than one cylinder.

Advantageous embodiments and refinements of the present invention may be gathered from the disclosure of the specification, with reference to the drawings.

According to one specific embodiment, the second and third fuel injector are situated in an intake manifold leading to the combustion chamber, the second and third fuel injector may be situated in a lower wall section of the intake manifold facing the combustion chamber. A placement in the lower wall section advantageously lies more favorably in terms of flow with regard to exhaust gases returning from the combustion chamber, so that the risk of a blockage of the second and third fuel injector is reduced.

According to one specific embodiment, the first fuel injector is situated in the intake manifold, the first fuel injector may be situated in an upper wall section of the intake manifold facing away from the combustion chamber.

In an advantageous manner, an especially compact development of the injection device is therefore possible, because the first fuel injector is situated on the wall of the intake manifold lying across from the second and third fuel injector.

According to one specific embodiment, the intake manifold between the second injection system and the combustion chamber is separated by an inner dividing wall, into a first intake duct discharging into the first intake opening, and a second intake duct discharging into the second intake opening, the second fuel injector being situated in the region of the first intake duct, and the third fuel injector being situated in the region of the second intake duct. In addition, the second and third fuel injector are advantageously situated separately from each other, and in particular also able to be actuated separately. It is also conceivable that only one of the two fuel injectors is actuated.

According to one specific embodiment, the distance between the second fuel injector and the first intake opening, and the distance between the third fuel injector and the second intake opening is smaller in each case than the distance between the first fuel injector and the first or second intake opening. The distance between the second injection system and the combustion chamber has been selected to be relatively small, so that the flight times of the injected fuel according to the second fuel composition become shorter. The evaporation of the gasoline-based fuel therefore takes place inside the combustion chamber, which cools the combustion chamber. The knock resistance increases as a result, so that greater outputs are able to be requested, especially in a full-load phase. Therefore, this specific embodiment is suitable for constructing an especially powerful internal combustion engine.

According to one alternative specific embodiment, the distance between the second intake valve and the first intake opening, and the distance between the third intake valve and the second intake opening is greater in each case than that between the first intake valve and the first or second intake opening. The distance between the second injection system and the combustion chamber is relatively large in this manner, so that the flight times of the injected fuel according to the second fuel composition become longer. This has the advantage that an efficient evaporation of the droplets begins already in the intake manifold, and a relatively stable and hot combustion is achieved in the combustion chamber in this manner. In particular in the start-up and warm-up phase, improved ignitability and more rapid heating of the catalytic converter are realized as a consequence, which reduces the exhaust-gas emissions. As a result, this specific embodiment is suitable for constructing an internal combustion engine that has especially low emissions.

According to one specific embodiment, the second and third fuel injector include only a single injection orifice for injecting the fuel having the second fuel composition, and/or the second and third fuel injector are dimensioned for a lower fuel through-flow range than the at least one first fuel injector. The fuel metering range thus is advantageously able to be optimized for each of the two different fuel compositions. The first fuel injector alternatively either has a single first injection orifice or at least two separate first injection orifices for injecting the fuel based on natural gas in the direction of the first and second intake opening. As an alternative, however, it is naturally also conceivable that the first injection system includes two or more first fuel injectors, which in particular have only a first injection orifice in each case, and are situated in the intake manifold or in the first and second intake duct.

According to one specific embodiment, the second and third fuel injector have different dimensions so that different quantities of fuel of the second fuel composition are injected through the second and third fuel injector. This allows for a considerable expansion of the fuel metering range, such as when, for example, only the particular one of the two fuel injectors that is dimensioned for a smaller through-flow quantity is actuated.

Another subject matter of the exemplary embodiments and/or exemplary methods of the present invention is an internal combustion engine, which includes an injection device according to the present invention.

Another subject matter of the exemplary embodiments and/or exemplary methods of the present invention is a method for operating an injection device, in which the first fuel injector is used to inject fuel having the first fuel composition based on natural gas, both in the direction of the first intake opening and in the direction of the second intake opening, and the second fuel injector is used to inject fuel having the second fuel composition based on gasoline is essentially injected only in the direction of the first intake opening, and the third fuel injector is used to inject fuel of the second fuel composition essentially only in the direction of the second intake opening. This advantageously realizes the aforementioned advantages of a reduction in the exhaust gases and the increase in power. This achieves a large maximally available flow rate range for the precise injection of the individually required fuel quantities.

According to one specific embodiment, the at least one first fuel injector is used exclusively for the injection of fuel having the first fuel composition, and the second and third fuel injector is used exclusively for the injection of fuel having the second fuel composition.

According to one specific embodiment, predominantly fuel having the second composition is injected by the second and third fuel injector in a start-up phase of the internal combustion engine, and in a load phase of the internal combustion engine, predominantly fuel having the first composition is injected by the first fuel injector. In this way the fuels with the different compositions are used for the particular requirements with maximum efficiency.

Exemplary embodiments of the present invention are illustrated in the drawing and explained in greater detail in the following description.

DETAILED DESCRIPTION

In the various figures, identical parts have always been provided with the same reference symbols and are therefore usually labeled or mentioned only once.

Figure 1:
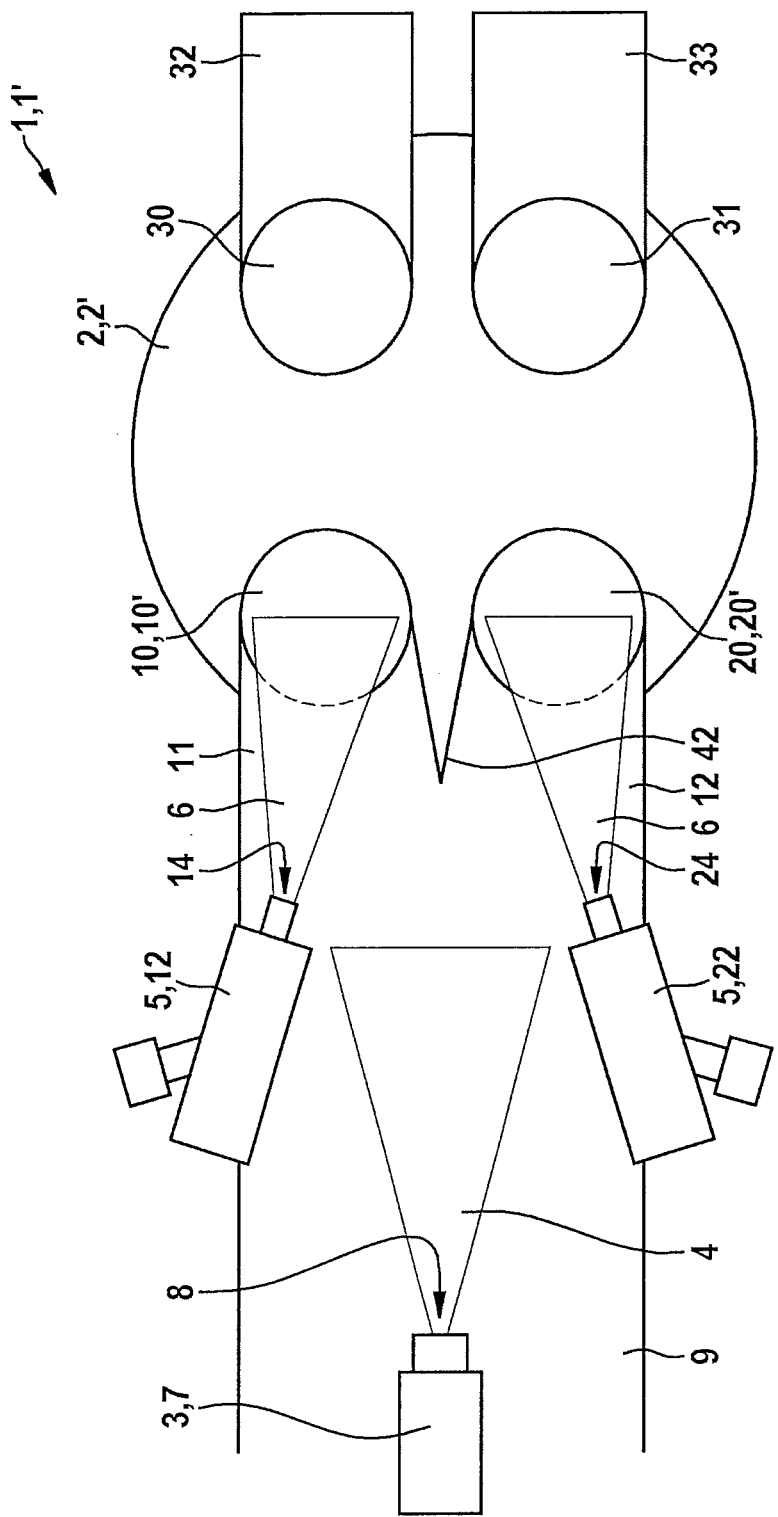
FIG. 1 shows a schematic plan view of an internal combustion engine having an injection device according to a first specific embodiment of the present invention.

FIG. 1 shows a schematic plan view of an internal combustion engine 1 having an injection device 1' according to a first specific embodiment of the present invention, which has a cylinder encompassing a combustion chamber 2, in which a piston 2' is moving. The wall of combustion chamber 2 has a first and a second intake opening 10, 20, through which an air-fuel mixture is aspirated into combustion chamber 2, and a first and second outlet opening 30, 31, through which the raw exhaust gases of the combusted air-fuel mixture are expelled from combustion chamber 2 into first and second outlet ducts 32, 33. Internal combustion engine 1 has a first intake valve 10', which is provided for sealing first intake opening 10 and disposed between a first intake duct 11 and combustion chamber 2. Internal combustion engine 1 furthermore has a second intake valve 20', which is provided for sealing second intake opening 20 and disposed between a second intake duct 21 and combustion chamber 2. First and second intake ducts 11, 21 discharge into a shared intake manifold 9 on a side facing away from combustion chamber 2, and a metered quantity of fresh air is aspirated through intake manifold 9 in the direction of combustion chamber 2 by a throttle valve (not shown) situated in intake manifold 9. First and second intake ducts 11, 21 essentially are separated from each other by a dividing wall 42 which is situated in intake manifold 9. Injection device 1' has a first and a second injection system 3, 5, which are provided for injecting fuel 4, 6 in the direction of first and second intake openings 10, 20 or into first and second intake duct 11, 21. Toward this end, first injection system 3 includes a first fuel injector 7, which includes at least one injection orifice 8, through which fuel 4 having a first fuel composition is injected both in the direction of the first and in the direction of second intake opening 10, 20. The first fuel composition is made up mainly of natural gas, which ensures relatively clean combustion, i.e., one featuring low emissions and high output, when internal combustion engine is used in (full) load operation. Since the start-up and warm-up phase is relatively inefficient when using a fuel that is based on natural gas, injection device 1' also has second injection system 5, which is provided for the injection of fuel 6 having a second fuel composition. The second fuel composition encompasses conventional gasoline, in particular. For this purpose, second injection system 5 includes a second and a separate third fuel injector 12, 22. Second fuel injector 12 has a single second injection orifice 14, through which fuel 6 having the second fuel composition is essentially injected solely in the direction of first intake opening 10. In analogous manner, third fuel injector 22 has a single third injection orifice 24, through which fuel 6 having the second fuel composition is essentially injected solely in the direction of second intake opening 20. First, second and third fuel injectors 7, 12, 22 are able to be actuated separately from each other. In the example at hand, the distance between second fuel injector 12 and first intake opening 10, and between third fuel injector 22 and second intake opening 20 is smaller in each case than that between first fuel injector 7 and first or second intake opening 10, 20. Second and third fuel injector 12, 22 are dimensioned for a lower fuel flow rate range than the at least one first fuel injector 7, since the injection of fuel 4 based on natural gas requires larger quantities to be injected in comparison with the injection of gasoline-based fuel 6.

Thus, first fuel injector 7 is used exclusively for the injection of fuel 4 having the first fuel composition, while second and third fuel injector 12, 22 each inject exclusively fuel 6 having the second fuel composition. The injection of fuel 6 of the second fuel composition takes place predominantly in the start-up and warm-up phase of internal combustion engine 1. The injection of fuel 4 having the first fuel composition, on the other hand, occurs predominantly in the load and full-load phase. By suitable control, first, second and third fuel injector 7, 12, 22 may be controlled as a function of the corresponding operating parameters, so that the ratio between the injected quantity of fuel 4 having the first fuel composition and the injected quantity of fuel 6 having the second fuel composition is controlled according to need and, in particular, continuously, in an effort to achieve the lowest possible emissions at sufficient output. Internal combustion engine 1 may have a plurality of such cylinders. Internal combustion engine 1 may include an Otto engine for an automobile.

Figure 2:
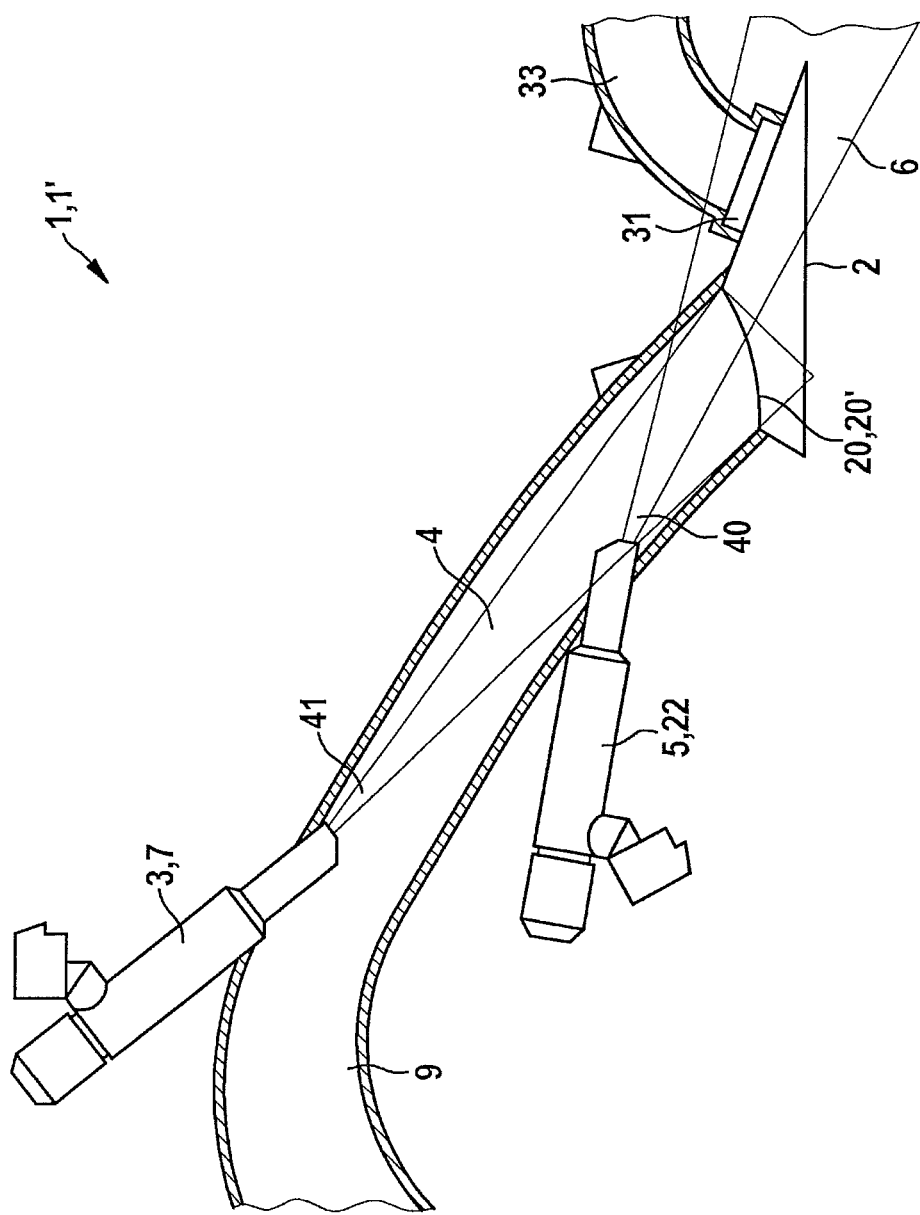
FIG. 2 shows a schematic sectional view of an internal combustion engine having an injection device according to a second specific embodiment of the present invention.

FIG. 2 shows a schematic plan view of an internal combustion engine 1 having an injection device 1' according to a second specific embodiment of the present invention. The second specific embodiment essentially is similar to the first specific embodiment illustrated in FIG. 1, the second and third fuel injector 12, 22 being situated in the region of a lower wall section 40, facing combustion chamber 2, of intake manifold 9. First fuel injector 7, on the other hand, is situated in a region of an upper wall section 41, facing away from combustion chamber 2, of intake manifold 9.

Figure 3:
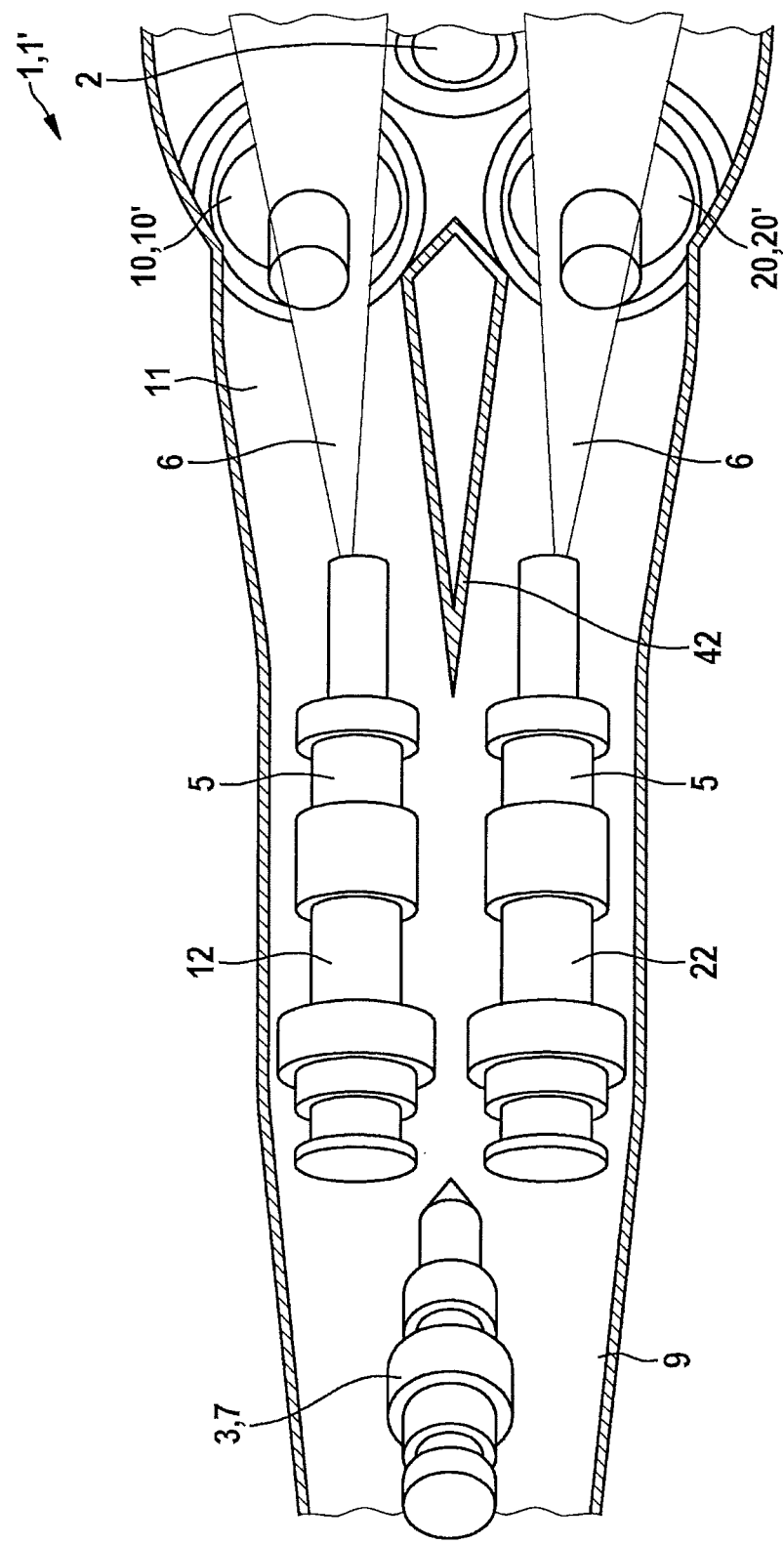
FIG. 3 shows a schematic plan view of an injection device according to the second specific embodiment of the present invention.

FIG. 3 shows a schematic plan view of injection device 1' illustrated in FIG. 2, according to the second specific embodiment of the present invention.

What is claimed is:

1. An injection device for an internal combustion engine, comprising:
 a first injection system for injecting fuel having a first fuel composition based on natural gas; and
 a second injection system for injecting fuel having a second fuel composition based on gasoline;
 wherein the first injection system has one first fuel injector for injecting fuel having the first fuel composition in the direction of both a first intake opening of a combustion chamber of the internal combustion engine and a second intake opening of the combustion chamber;
 wherein the second injection system has a second fuel injector for injecting fuel having the second fuel composition essentially only in the direction of the first intake opening, and a separate third fuel injector for injecting fuel having the second fuel composition essentially only in the direction of the second intake opening.

2. The injection device of claim 1, wherein the second fuel injector and the third fuel injector are situated in an intake manifold leading to the combustion chamber, the second fuel injector and the third fuel injector being situated in a lower wall section, facing the combustion chamber, of the intake manifold.

3. The injection device of claim 1, wherein the first fuel injector is situated in the intake manifold, the first fuel injector being situated in an upper wall section, facing away from the combustion chamber, of the intake manifold.

4. The injection device of claim 1, wherein the intake manifold between the second injection system and the combustion chamber is separated by an inner separating wall into a first intake duct which is discharged into the first intake opening, and a second intake duct which is discharged into the second intake opening, the second fuel injector being situated in the region of the first intake duct, and the third fuel injector being situated in the region of the second intake duct.

5. The injection device of claim 1, wherein a distance between the second fuel injector and the first intake opening, and a distance between the third fuel injector and the second intake opening is smaller in each case than a distance between the first fuel injector and the first intake opening or the second intake opening.

6. The injection device of claim 1, wherein the second fuel injector and the third fuel injector include only a single injection orifice for injecting the fuel having the second fuel composition, and the second fuel injector and the third fuel injector are dimensioned for a lower fuel through-flow range than the at least one first fuel injector.

7. The injection device of claim 1, wherein the first fuel composition comprises compressed natural gas.

8. An internal combustion engine, comprising:
   an injection device, including:
      a first injection system for injecting fuel having a first fuel composition based on natural gas; and
      a second injection system for injecting fuel based on gasoline;
      wherein the first injection system has one first fuel injector for injecting fuel having the first fuel composition in the direction of both a first intake opening of a combustion chamber of the internal combustion engine, and a second intake opening of the combustion chamber; and wherein the second injection system has a second fuel injector for injecting fuel having the second fuel composition essentially only in the direction of the first intake opening, and a separate third fuel injector for injecting fuel having the second fuel composition essentially only in the direction of the second intake opening.

9. The internal combustion engine of claim 8, wherein the first fuel composition comprises compressed natural gas.

10. A method for injecting fuel in an internal combustion engine, the method comprising:
   injecting, using a first injection system, fuel having a first fuel composition based on natural gas; and
   injecting, using a second injection system, fuel having a second fuel composition based on gasoline;
   wherein the first injection system has one first fuel injector for injecting fuel having the first fuel composition in the direction of both a first intake opening of a combustion chamber of the internal combustion engine, and a second intake opening of the combustion chamber; and
   wherein the second injection system has a second fuel injector for injecting fuel having the second fuel composition essentially only in the direction of the first intake opening, and a separate third fuel injector for injecting fuel having the second fuel composition essentially only in the direction of the second intake opening.

11. The method of claim 10, wherein the first fuel injector is used exclusively for injecting fuel having the first fuel composition, and the second fuel injector and the third fuel injector are used exclusively for injecting fuel having the second fuel composition.

12. The method of claim 10, wherein predominantly fuel having the second composition is injected by the second fuel injector and the third fuel injector in a start-up phase of the internal combustion engine, and wherein in a load phase of the internal combustion engine, predominantly fuel having the first composition is injected by the first fuel injector.

13. The method of claim 10, wherein the first fuel composition comprises compressed natural gas.

\* \* \* \* \*